US010149077B1

(12) United States Patent
Adams et al.

(10) Patent No.: US 10,149,077 B1
(45) Date of Patent: Dec. 4, 2018

(54) AUDIO THEMES

(71) Applicant: Rawles LLC, Wilmington, DE (US)

(72) Inventors: Jeffrey P. Adams, Tyngsborough, MA (US); Frederick V. Weber, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 360 days.

(21) Appl. No.: 13/644,446

(22) Filed: Oct. 4, 2012

(51) Int. Cl.
*H04R 27/00* (2006.01)
*G06F 21/60* (2013.01)
*H04N 21/436* (2011.01)
*H04N 21/422* (2011.01)
*H04N 21/233* (2011.01)

(52) U.S. Cl.
CPC .................................... *H04R 27/00* (2013.01)

(58) Field of Classification Search
USPC ........ 345/158, 419; 704/270, 275, 243, 254; 382/103; 700/94
See application file for complete search history.

(56) References Cited

U.S. PATENT DOCUMENTS

| | | | | |
|---|---|---|---|---|
| 6,532,447 | B1 * | 3/2003 | Christensson | 704/275 |
| 7,036,257 | B1 * | 5/2006 | Sardo | A47G 1/0616 229/87.03 |
| 7,310,604 | B1 * | 12/2007 | Cascone | G10K 15/02 704/272 |
| 7,418,392 | B1 | 8/2008 | Mozer et al. | |
| 7,720,683 | B1 | 5/2010 | Vermeulen et al. | |
| 7,774,204 | B2 | 8/2010 | Mozer et al. | |
| 2003/0220705 | A1 * | 11/2003 | Ibey | H04R 5/04 700/94 |
| 2005/0085272 | A1 * | 4/2005 | Anderson et al. | 455/566 |
| 2006/0053377 | A1 * | 3/2006 | Newell | G06F 1/163 715/744 |
| 2008/0103615 | A1 * | 5/2008 | Walsh | H04S 3/008 700/94 |
| 2008/0109095 | A1 * | 5/2008 | Braithwaite | H04L 12/2823 700/94 |
| 2010/0250253 | A1 * | 9/2010 | Shen | H04R 1/1041 704/260 |
| 2011/0077802 | A1 * | 3/2011 | Halloran | A47L 5/30 701/2 |
| 2012/0016678 | A1 * | 1/2012 | Gruber et al. | 704/275 |
| 2012/0223885 | A1 | 9/2012 | Perez | |
| 2013/0218566 | A1 * | 8/2013 | Qian | G10L 13/033 704/260 |

FOREIGN PATENT DOCUMENTS

| | | |
|---|---|---|
| WO | WO2011088053 | 7/2011 |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Yogeshkumar Patel
(74) *Attorney, Agent, or Firm* — Lee & Hayes, PLLC

(57) ABSTRACT

A home interface comprises one or more audio interfaces within the premises of users. The audio interfaces are connected to an assistant service that detects conditions within rooms of user premises and that generates simulated audio themes for the rooms. The audio themes may be changed depending on detected conditions, and subthemes of a given audio theme may be implemented in different rooms.

26 Claims, 3 Drawing Sheets

AUDIO THEMES

BACKGROUND

Homes and other user premises commonly have numerous "intelligent" devices, which provide information and services to users and which may also allow control of various local and remote systems. Increasingly, such devices have network communications capabilities, allowing communications between various types of devices and with remote systems, servers, and data sources. The common availability of such distributed and networked devices has created a number of new possibilities for services and other functionality.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Described herein are systems and techniques for interacting with users within a home or other location. To monitor audio information, including user speech, network-enabled microphones or audio units can be placed at different activity centers within the home. The microphones may be incorporated in small, self-contained units, with wireless networking capabilities, and configured to transmit audio-based information to a personal assistant service or other voice-controlled service. The personal assistant service may monitor the audio-based information and process it to identify events, status, or other information about current activities within the home. The assistant service may also identify commands that are spoken by users within the home.

Audio speakers may be integrated with the microphones, allowing the assistant service to respond to users in various ways, including through the use of synthesized or computer-generated speech.

In response to various conditions that are detected within the home, the assistant service may use the speakers of the audio units to simulate different audio themes in the home or in different regions or rooms of the home. For example, the personal assistant service may generate sounds and/or speech to emulate different locales or personas, such as by using different salutations, languages, grammars, and so forth, depending on the detected identity or characteristics of a user or on the location of the user within the home. In addition, different acoustic subthemes may be simulated in different rooms of the home in accordance with a given primary audio theme, and the individual acoustic subthemes may be coordinated over time.

Figure 1:
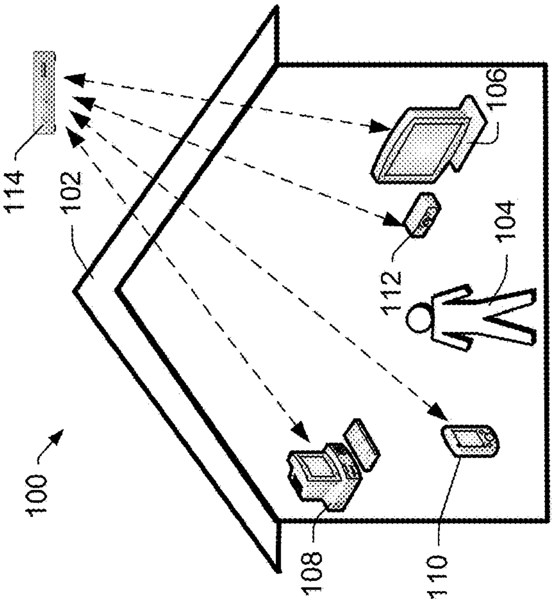
FIG. 1 is a block diagram illustrating an operational environment in which an assistant service may generate audio or audio themes for users based on detected conditions within the premises of the users.

FIG. 1 illustrates an environment 100 in which these techniques may be practiced. The environment includes a home or other user premises 102. User premises may include houses, offices, automobiles, and other spaces.

Within the home 102 are one or more users 104 and several devices associated with the user(s) 104. The illustrated devices include a media device 106, representing any one or more of various types of devices such as televisions, audio players, video players, and so forth. The illustrated devices also include a computer 108, which represents one or more of various types of devices such as laptop computers, desktop computers, tablet computers, netbooks, other network-enabled devices, and so forth. A personal computing device 110 may also be associated with the user, such as a smartphone, pager, PDA (personal digital assistant), handheld phone, book reader device, or other type of portable device.

Note that the devices shown within the home 102 are merely examples of a wide variety of devices that may be present within a user premises or associated with a user. Many such devices may have some sort of network connectivity, which may be implemented using various types of communication technologies, including both wired and wireless technologies. In many cases, the communications capabilities of the devices may allow connection, through the Internet or wide-area network, with local or remote servers, services, databases, websites, and so forth.

The user's home 102 may be equipped with one or more on-premises audio monitoring devices 112, referred to herein as in-home audio interface units or devices. An in-home audio interface device 112 may in some embodiments comprise a device having an audio microphone, an audio speaker, and a network interface. The interface device 112 may be relatively small, so that several such devices can be unobtrusively placed at various locations within the home 102. As an example, interface devices 112 may be implemented in small, cylindrical enclosures.

The in-home audio interface devices 112 can be placed within the home 102 so that their microphones detect ambient sound or noise within the home 102. The in-home audio interfaces may be placed within different regions of the home 102, such as in different rooms of the home 102.

Note that the other devices within the home 102, including the media device 106, the computer 108, and the personal computing device 110, may also function as audio interface devices, or may be configured to function as audio interface devices.

In the embodiment shown in FIG. 1, the audio interface devices 112 communicate with and transmit ambient information to a personal assistant server or service 114. The assistant service 114 may be located in the home 102 or at a remote location. For example, the assistant service 114 may in some cases be implemented as a web-based server that is located geographically apart from the home 102. The interface devices 112, as well as other devices within the home 102, may communicate with the assistant service 114 using various communications technologies, including wired and wireless networking technologies, cellular technologies, and so forth. In certain implementations, such communications may be conducted over the Internet, or over other similar networks. In certain implementations, the assistant service may provide similar services to a large number of homes 102.

In operation, the assistant service 114 receives environmental information, including audio-based information, from the audio interface devices 112 and any other devices within the home 102. The environmental information may include audio streams, user commands or notifications derived from vocal utterances, information derived from on-premises audio, and so forth. The assistant service 114 processes the audio-based information and any other available information to determine or detect various conditions within the user environment, such as activities, status, utterances, spoken commands, etc. The assistant service 114 can then respond to this information in various ways, such as by performing services, providing information, controlling the conditions within the home, performing actions on the user's behalf, and so forth. In some implementations, the assistant service 114 may respond to detected conditions by generating and/or rendering speech within the home, directed to the user 104. As will be described below, the assistant service 114 may also provide or generate varying audio themes or atmospheres within the home, and may vary the audio themes based on detected conditions. The audio themes may specify characteristics of any generated speech, as well as characteristics of other audio or sounds that may be generated or provided within the home 102.

Figure 2:
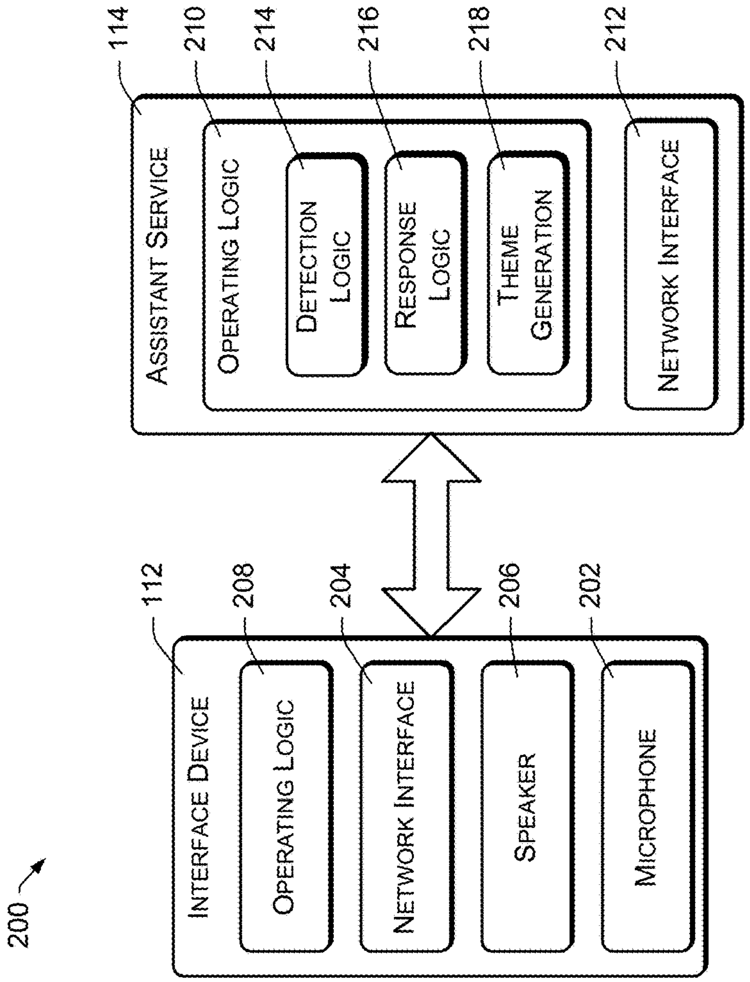
FIG. 2 is a block diagram illustrating additional details regarding the system of FIG. 1.

FIG. 2 illustrates an architecture 200 that includes an example implementation of the interface device 112 and an example implementation of the assistant service 114.

One or more in-home audio interface devices 112 may be located within the home 102 as described above, in addition to other devices that may be configured to provide similar functionality. An individual interface device 112 may include a microphone 202 that is configured to detect ambient noise, sounds, and speech. The interface device 112 may also include a network interface 204 that facilitates network communications with various entities, including the assistant service 114. The interface device 112 may also include a speaker 206 and operating logic 208. The operating logic 208 may be implemented as one or more programmable processing units, associated memory, and appropriate instructions stored in the memory and executed by the processing unit. Other types of logic may also be used to configure the interface device 112 to perform the functions described here.

In addition to the microphone 202 and the speaker 206, the interface device 112 may include other types of sensors. For example, the interface device 112 may include environmental sensors, cameras, actuators, detectors, user interface elements, displays, and so forth. Note that various different types of devices may be configured to serve as interface devices.

In one embodiment, the interface device 112 is configured to send audio-based information to the assistant service 114, based on audio received or captured by the microphone 202 of the interface device 112. The audio-based information may comprise a continuous audio stream, or may comprise separate audio streams corresponding to different periods of activity or noise within the home 102 nearby the interface device 112. For example, an audio stream may be transmitted whenever ambient sound levels exceed a minimum threshold.

In other embodiments, the interface device 112 may pre-process the audio from the microphone 202, and may transmit higher level audio-based information to the assistant service 114. For example, the operating logic 208 of the interface device 112 might perform speech recognition on the ambient audio, and transmit interpreted commands or text streams to the assistant service 114. In some embodiments, the interface device 112 may utilize online or cloud-based services, such as music databases or other services, to perform its functions.

Note that individual interface devices 112 can be associated with respective premises through an initialization or registration procedure, and communications with interface devices can be authenticated using cryptographic techniques.

The assistant service 114 may comprise a device, a server, or any other entity capable of performing the actions described below. In the illustrated embodiment, the assistant service 114 may comprise a computer or server having operating logic 210 and a network interface 212. The operating logic 210 may be implemented as one or more programmable processing units, associated memory, and appropriate instructions stored in the memory and executed by the processing unit. Other types of logic may also be used to configure the interface device 112 to perform the functions described herein.

In addition to other modules or functional components, not shown, the operating logic 210 may include detection logic 214, which may include speech-to-text conversion. The detection logic 214 may be configured to receive audio information and other information from various interface devices 112 and to determine local conditions within and without the home 102 based on the received audio and other information.

Conditions detected by the detection logic 214 may include the identity of a user or users within the home 102. The conditions may additionally, or alternatively, include characteristics of the users. For example, voice recognition and other audio analysis techniques may be used to identify the presence and identities of users, the moods of users, the genders (male or female) of users, relative ages of users, and so forth. In addition to using audio to identify users and user characteristics, other capabilities and sensors of the interface devices 112 may be used to detect relevant conditions. For example, identifications of users and user characteristics may be based on pictures or video supplied by the interface devices 112.

The detected conditions may also include characteristics of the environment itself, such as background noise levels, number of users within a room, temperature, light levels, acoustic characteristics, and so forth. In addition, the detected conditions may include user activities, utterances, commands, instructions, and so forth.

The detection logic 214 may also utilize information received from sources other than the interface devices 112, such as information obtained from various online sources and services, to identify various conditions and/or events. Such conditions and/or events may include conditions and/or events outside the local environment of the user 104 or home 102. For example, the detection logic 214 may utilize outside or independent sources to obtain information about time, weather, nearby events, and even worldwide events and conditions. In addition, other devices within the home 102 may be monitored to detect conditions, actions, events, and status.

The operating logic 210 of the assistant service 114 may also include response logic 216 that performs appropriate responses or actions in response to user commands or instructions, such as in response to spoken commands by the user 104 within the home 102. Automatic speech recognition and natural language understanding technologies may be used to understand speech spoken by a user and determine an appropriate responsive action.

Responsive actions performed by the assistant service 114 may include rendering requested music or other media within the home 102, providing requested information, controlling home equipment, performing web-based actions, and so forth. Responsive actions may also include or be performed in conjunction with speech that is generated for presentation to the user 104 in response to user commands or other actions of the user 104. For example, the assistant service 114 may generate audio speech and provide the audio speech to the interface device 112 for rendering by the speaker 206 of the interface device 112. Other types of audio, including music, may be rendered by the speaker 206 in response to user commands and/or conditions detected by the environmental detection logic 214.

The operating logic 210 of the assistant service 114 may also include audio theme generation logic 218. The audio theme generation logic 218 may be responsive to the detection logic 214 to select, generate, or simulate various audio themes in the home 102 or in individual rooms of the home 102, and to dynamically change the audio themes in response to detected conditions.

Generally, each of the audio themes specifies one or more audio characteristics of a simulated situation or environment. When audio is subsequently produced for a room or rendered in the room, it is rendered using the audio characteristics of the selected audio theme.

An audio theme may include audio content played within the home 102 as well as characteristics of audio played within the home. For example, an audio theme may include background audio or sounds associated with a particular situation or environment other than the environment of the home 102, such as the audio environment of a geographic location. Thus, an audio atmosphere may include sounds that are characteristic of a beach, a train, a market, a swimming pool, and so forth. Locations or situations such as this may include fictional locations, such as locations or settings characteristics of scenes in movies or books. In many of these examples, the background sounds may comprise environmental sounds, such as wind, ocean waves, the clicking of a train on tracks, crowd noises, mechanical noises etc. Background sounds may include both natural sounds and man-made or synthesized sounds, including music.

Generally, background sounds are rendered within the user environment independently of commands issued by users or and independently of responses issued in response to such commands. Background sounds may include music, nature sounds, sounds of people gatherings, city sounds, entertainment sounds, or other sounds.

The audio theme may also specify characteristics of foreground audio, such as sounds that are rendered in conjunction with actions performed by the assistant service, including actions that are performed in response to user requests and commands. Foreground audio may be created, for example, by using a text-to-speech engine to generate audio from text. Foreground audio characteristics may include characteristics of synthesized or generated speech used in responding to users within the home 102. Such characteristics may include linguistic accents, languages, dialects, and vocabularies used in generated speech; and/or simulated attitudes, personalities, genders, moods, personalities, personas, temperaments, behaviors, phraseologies, and tones of simulated speakers.

Background and foreground audio sounds and/or characteristics may also correspond to situations, environments, scenarios, settings, or scenes from stories or familiar situations. For example, spoken audio and background audio may be generated to simulate different situations or scenarios. Thus, in a particular audio theme, spoken audio presented to the user may have characteristics of a military situation or environment, and may include verbal commands that are phrased as if they were given to a military superior or inferior. In addition, the commands may emulate voices that are stereotypical of people who might be found in the simulated situation or environment—such as a drill instructor.

A given audio theme may comprise a plurality of audio subthemes. For example, an audio theme may include audio subthemes associated with different portions of a known environment or situation, such as different parts of a ship, building, or geographic landscape. As an example, an audio theme may include subthemes corresponding to different locations depicted in a book or movie, or different rooms of a structure such as a ship. An audio theme for a cruise ship, for example, may include subthemes corresponding respectively to dining areas, pool areas, the command bridge, guest rooms, and so forth. Similarly, an audio theme for an international environment may include subthemes corresponding to characteristic of different cultures or cities. As another example, an audio theme may correspond to a fictional environment, and individual subthemes may comprise sounds that are from different settings of the environment, such as different locations, worlds, and so forth. The subthemes may include background sounds as well as different voices and personas, corresponding to different people who might be associated with the different locations within a cruise ship. In addition, different instances of subthemes may be provided for different times of day, such as for daytime and nighttime or different times of year, such as different seasons.

In situations where different rooms of a home 102 have respective interface devices 112, an audio theme may be applied to the home 102 as a whole, with different subthemes of the audio theme produced in each of the different rooms. In addition, the audio subtheme within an individual room may be dynamically changed based on factors such as conditions within the room and other conditions such as time of day and location of users within the home.

Figure 3:
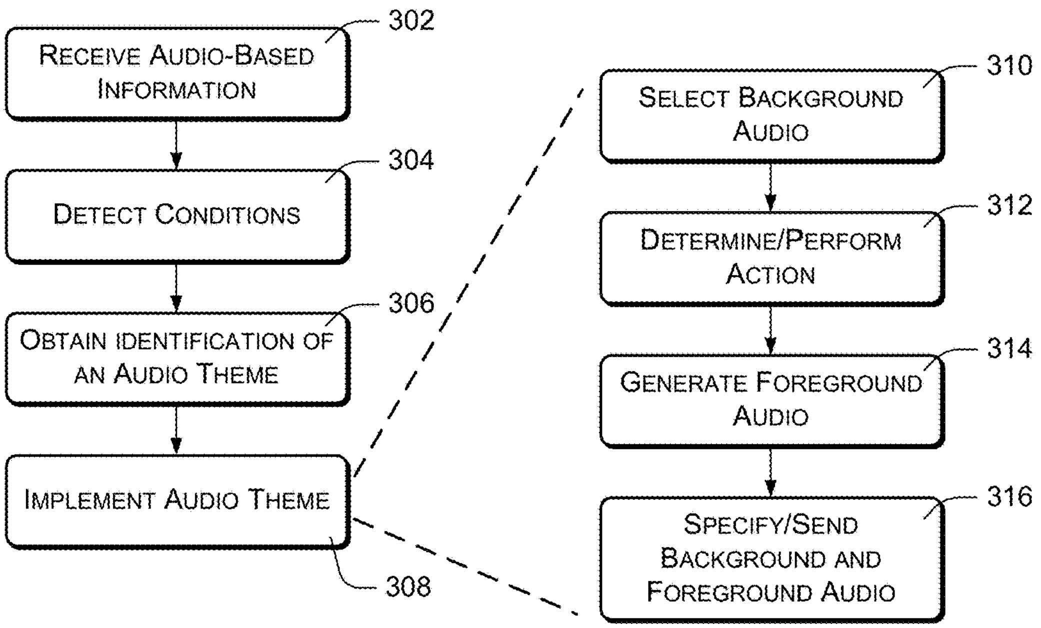
FIGS. 3-5 are flow diagrams illustrating example processes that may be implemented within the environment of FIGS. 1 and 2.

FIG. 3 shows actions that may be performed in accordance with the embodiments described herein. An action 302 comprises receiving audio-based information and/or other information from premises associated with one or more users, such as a home, office, automobile, etc. The received information may comprise an audio stream or data derived from an audio stream. Audio may be received by an in-home or on-premises device, server, or application, by a cloud-based service or assistant service, by other cloud-based services and applications, or combinations of these entities.

An action 304 comprises detecting conditions within one or more rooms from which the audio has been received. This may include processing the audio-based information to detect certain conditions such as locations, identities, and characteristics of users. Location may be determined by determining the room from which spoken audio or other noises have been received. Voice recognition may be used to detect the identity of a user. Other types of analyses may be used to detect user characteristics. For example, it may be possible in some situations to determine user age, gender, activity levels, mood, etc. by using voice analysis. Furthermore, in certain situations it may be possible to determine user locations within a room using audio analysis.

Detected conditions may also include user commands, actions, activities, identities, and characteristics, as well as environmental conditions. The action 304 may include automatic speech recognition, speech-to-text conversion, natural language understanding, music recognition, and other types of audio recognition.

The action 304 may also include detecting certain conditions based on information other than audio. For example, devices and/or sensors within the user premises may allow detection of images, video, temperature, brightness levels, ambient noise levels, and so forth within different rooms of a home. In addition, the action 304 may include detecting conditions outside of the user premises, such as weather, time of day, day of the month, time of year or season of the year, holidays, events, and so forth.

An action 306 comprises obtaining or receiving an identification of an audio theme for use within the environment. As an example, a user may select an audio theme from multiple available themes. Alternatively, the audio theme may be selected based on the conditions detected in the action 304. Thus, different audio themes may be selected based on the identity of users within an environment or room, characteristics of the users, moods or activity levels, and other information relating to conditions both within the room, within the user premises, and/or outside the user premises. Obtaining or receiving an audio theme may be performed at any time, including before receiving the audio-based information.

An action 308 comprises simulating or implementing the selected audio theme within the user environment. As described above, this may include generating background sounds as well as tailoring foreground sounds (such as generated speech) to the selected environment.

Implementing the selected audio theme may be performed in conjunction with other activities performed by an assistant service. For example, an audio atmosphere may be implemented in conjunction with providing weather information to a user in response to the user's request, or in conjunction with rendering various types of media to the user.

The right side of FIG. 3 illustrates an example of how the action 308 of implementing the selected audio theme may be performed. An action 310 may comprise selecting background audio having characteristics in accordance with the current audio theme. The may comprise selecting music, nature sounds, sounds of people gatherings, city sounds, entertainment sounds, and so forth. In some cases, the audio theme may specify a particular background sound, while in other cases the audio theme may merely specify characteristics of background sounds such as mood, tempo, location, type, etc.

An action 312 may comprise determining and/or performing a response or action to be performed in response to or based on the information received in the action 302 and/or the conditions detected in the action 304. For example, the action 312 may comprise determining and performing an action in response to a user command.

An action 314 may comprise producing, specifying, or generating foreground audio for use in conjunction with the action performed at 312. For example, the action 314 may comprise generating speech for playback to a user in response to a user query or command. The foreground audio is generated so that it has characteristics in accordance with the current audio theme, which may include such things as language, accents, genders, moods, personalities, and so forth.

An action 316 may comprise specifying and/or sending the background and foreground audio to the user environment, to be played on a speaker within the user environment.

Figure 4:
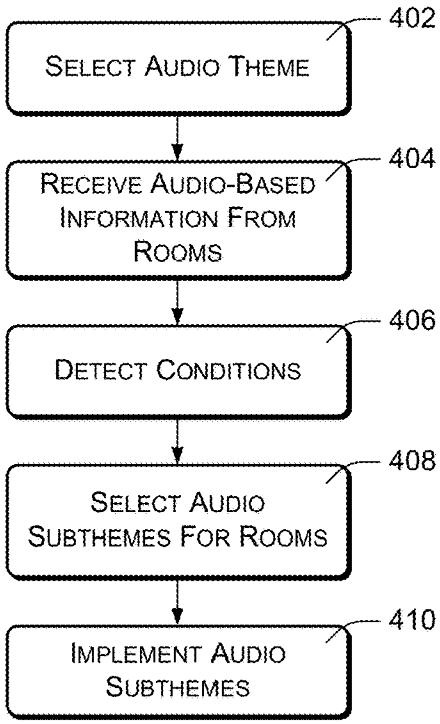

FIG. 4 shows another example of actions that may be performed in accordance with the embodiments described herein, in which audio subthemes are used for individual rooms or for different portions of a room. An action 402 comprises selecting an audio theme. The theme may be selected by a user or the theme may be selected based on other conditions. As described above, a theme may comprise a plurality of individual audio subthemes, which are to be implemented in different rooms of an environment and/or at different times. The subthemes may be selected by a user or the subthemes may be selected based on other conditions. For example, different first and second background audio may be selected and provided for playback in first and second rooms of a home, based on information received from or conditions detected in the first and second rooms. Similarly, first and second foreground audio may be produced and provided for playback in the first and second rooms of the home, based on information received from or conditions detected in the first and second rooms. The first foreground and background audio may correspond to a first theme or subtheme, while the second foreground and background audio may correspond to a second theme or subtheme.

Note that the foreground and background audio may be rendered simultaneously or concurrently within a given room. Mixing or combining the foreground and background audio may be performed either by the assistant service or by the interface device.

An action 404 comprises receiving audio-based information from one or more rooms of a home or other structure. Such audio-based information may be captured or collected using home interface devices 112 as described above, or using other equipment. Other information may be received as well, as described above.

An action 406 comprises detecting conditions within one or more rooms from which the audio has been received. This may include processing the audio-based information to detect certain conditions such as locations, identities, characteristics of users, user commands, actions, and so forth as described above with reference to the action 304. The action 406 may also include detecting certain conditions from respective rooms based on information other than audio, and may include detecting conditions outside of the immediate user environment.

An action 408 comprises selecting audio subthemes for one or more of the rooms, based on the audio theme selected in the action 402. In addition, the action 408 may include varying or dynamically changing the audio subtheme of a particular room based on the conditions detected in the action 406.

An action 410 comprises simulating or implementing the selected acoustic subthemes within the respective rooms of the home or structure.

Figure 5:
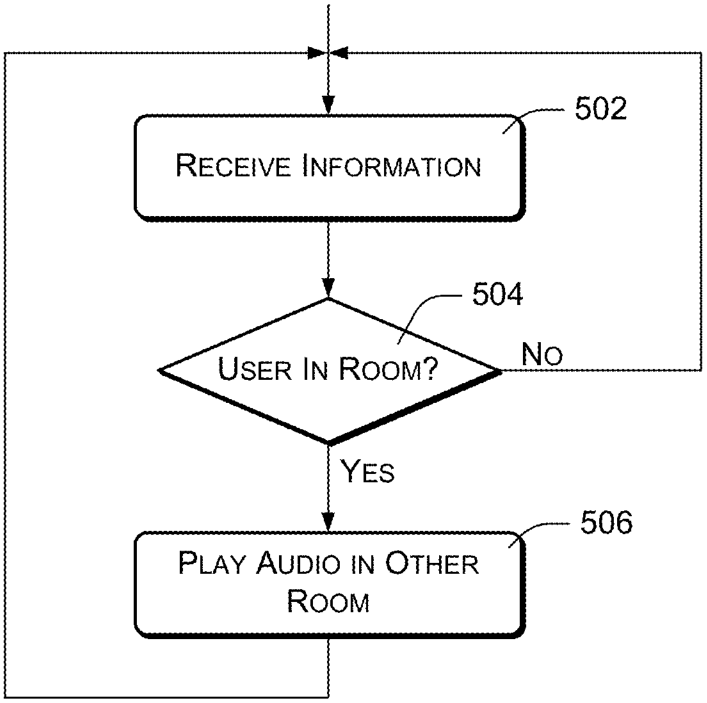

FIG. 5 illustrates an example of how the techniques described above may be used to generate an atmosphere that interacts with or responds to a user by moving a simulated entity of an audio theme from room to room depending on the current location of the user.

An action 502 comprises receiving information from a plurality of rooms of a user environment, such as receiving audio-based information and/or other information as described above.

An action 504 comprises determining whether a user is present in a particular room using the information received at 502. If the user is present in a particular room, an action 506 is performed, comprising selecting or producing background or foreground audio in accordance with a preselected audio theme and playing the selected background or foreground audio in a different room of the user environment—in a room other than the room in which the user is present. The different room may be a room that is adjacent or nearby the room in which the user is present. The action 506 may comprise selecting background or foreground audio, sending or specifying the background or foreground audio to the user environment, and/or playing the background or foreground audio on a speaker in the different room of the user environment.

The actions of FIG. 5 may be performed repetitively as illustrated so that the background audio is repeatedly moved to one or more rooms that are not occupied by the user. The background audio may be different as it moves from room to room, or may comprise the same sound or sounds as the background audio is moved from one room to another.

An audio theme in this example may be selected to include sounds or characteristics of an emulated person or creature such as a virtual dog or other pet. The sounds may include talking, barking, footsteps, snoring, and so forth, depending on the characteristics of the person or creature being emulated.

By repeating the actions 502, 504, and 506 the emulated person or creature seems to move around the house in response to user movement. In this case, the person or creature may move to rooms near the user, without ever seeming to be in the same room as the user. In other examples, a theme may be configured so that a particular source of sound follows the user from room to room.

The techniques described above allow audio themes to be simulated within a home or other premises. Dynamically varying the audio themes based on sensed conditions and activities may serve to increase realism and add interest to an environment.

The various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

The invention claimed is:

1. An apparatus, comprising:

one or more processors; and memory containing instructions that are executable by the one or more processors to perform actions comprising:

obtaining an identification of an audio theme, wherein the audio theme specifies at least one audio characteristic of a simulated situation;

selecting first background audio having a first characteristic of the audio theme;

sending the first background audio to a device within a user environment, wherein the first background audio is played on a first speaker of the device within the user environment;

receiving audio from one or more regions of the user environment, the audio at least including a spoken request from a user within the one or more regions of the user environment;

determining a response to the spoken request;

selecting foreground audio based at least in part on the response, the foreground audio including the response and having a second characteristic of the audio theme that is determined based at least in part on the simulated situation and that is different from the first characteristic;

sending the foreground audio to the device within the user environment for output on the first speaker of the device within the user environment;

selecting second background audio having a third characteristic of the audio theme, wherein the second background audio is different than the first background audio; and sending the second background audio to at least one of the device within the user environment for output on a second speaker of the device within the user environment or a second device for output on a third speaker of the second device.

2. The apparatus of claim 1, wherein obtaining the identification of the audio theme comprises receiving a selection of the audio theme from the user.

3. The apparatus of claim 1, wherein selecting the foreground audio comprises using a text-to-speech engine to generate the foreground audio from text associated with the response.

4. The apparatus of claim 1, the actions further comprising detecting one or more conditions within the one or more regions of the user environment, the one or more conditions comprising at least one of a background noise level within one of the one or more regions of the user environment, a number of users within one of the one or more regions of the user environment, a temperature of one of the one or more regions of the user environment, or light levels of one of the one or more regions of the user environment.

5. A system, comprising:

one or more processors; and memory containing instructions that are executable by the one or more processors to perform actions comprising:

selecting background audio corresponding to an audio theme and having a first characteristic of the audio theme;

sending the background audio to a first device within a user environment, wherein the background audio is played on a first speaker of the first device within the user environment;

determining an identity of a user in a room of the user environment;

receiving a spoken request from the user of the user environment;

determining a response to the spoken request based at least in part on the identity of the user;

selecting first foreground audio, the first foreground audio including the response and having at least a second, different characteristic that is determined based at least in part on the audio theme;

sending the first foreground audio to the first device within the user environment for output on the first speaker of the first device within the user environment;

selecting second foreground audio having a third characteristic of the audio theme; and sending the second foreground audio to a second device within the user environment for output on a second speaker of the second device within the user environment.

6. The system of claim 5, the actions further comprising:

selecting the second foreground audio in response to receiving information from a second room of the user environment; and determining a second response based at least in part on the information, the second foreground audio including the second response.

7. The system of claim 5, wherein determining the response to the user request is further based at least in part on one or more conditions within the room of the user environment, and wherein the one or more conditions are based at least in part on characteristics of the user.

8. The system of claim 5, the actions further comprising selecting the audio theme based at least in part on the identity of the user.

9. The system of claim 5, wherein:

determining the response to the user request comprises performing speech recognition on the spoken request; and selecting the first foreground audio comprises using a text-to-speech engine to generate first foreground audio from text associated with the response.

10. The system of claim 9, the actions further comprising:

receiving second information from a second room of the user environment;

wherein determining the response to the spoken request is based at least in part on the second information.

11. The system of claim 6, wherein:

the first foreground audio corresponds to a first subtheme of the audio theme; and the second foreground audio corresponds to a second subtheme of the audio theme.

12. The system of claim 11, wherein the audio theme comprises sounds from a cruise ship, the first subtheme comprises sounds from a swimming pool of the cruise ship, and the second subtheme comprises sounds from an engine room of the cruise ship.

13. The system of claim 5, wherein the second characteristic is one of:

a language;

an accent;

a gender;

a mood; or a personality.

14. A computer-implemented method comprising:

under control of one or more processors configured with executable instructions, selecting background audio having a first characteristic of an audio theme;

sending the background audio to a device within a user environment, wherein the background audio is played on a speaker of the user environment;

receiving information from a room of the user environment, the information comprising at least a spoken instruction representing a user request;

determining a response to the user request;

selecting first foreground audio, the first foreground audio including the response and having a second characteristic that is determined based at least in part on the audio theme and that is different from the first characteristic, the first foreground audio corresponding to a first subtheme of the audio theme;

sending the first foreground audio to the device within the user environment for output on the speaker of the device within the user environment;

selecting second foreground audio corresponding to a second subtheme of the audio theme; and sending the second foreground audio to the device within the user environment for output on a second speaker of the device within the user environment.

15. The method of claim 14, further comprising selecting the audio theme based at least in part on the information.

16. The method of claim 14, wherein:

determining the response to the user request comprises performing speech recognition on the user request, and further comprising:

selecting at least one of the first foreground audio or the second foreground audio using a text-to-speech engine to generate the foreground audio from text associated with the response.

17. The method of claim 14, wherein the first subtheme comprises sounds from a first setting of a fictional environment and the second subtheme comprises sounds from a second setting of the fictional environment.

18. The method of claim 14, wherein selecting the background audio comprises at least one of:

selecting music;

selecting nature sounds;

selecting sounds of people gatherings;

selecting city sounds; or selecting entertainment sounds.

19. The method of claim 14, wherein determining the response to the user request is based at least in part on one or more conditions, wherein the one or more conditions are based at least in part on the information, and wherein the one or more conditions comprise at least one of:

presence of the user;

identity of the user;

mood of the user;

age of the user;

gender of the user;

time of day;

day of week;

weather; or user activity level.

20. A computer-implemented method comprising:

under control of one or more processors configured with executable instructions, receiving first information from a first room of a user environment, the first information comprising an identity of a person present in the first room;

selecting, by a remote device located remotely from the user environment, first audio corresponding to an audio theme based at least on the first information, the first audio having a first characteristic that is determined based at least in part on the audio theme;

sending, by the remote device, the first audio to a first device, wherein the first audio is played on a first speaker of the first device within a second room of the user environment and wherein the second room is different from the first room;

receiving second information from the second room, the second information comprises at least audio representing a user request;

selecting, by the remote device, first foreground audio corresponding to the audio theme, the first foreground audio including a response to the user request and having a second characteristic that is determined based at least in part on the audio theme that is different from the first characteristic;

sending, by the remote device, the first foreground audio to a second device, wherein the second audio is played on a second speaker of the second device within a third room of the user environment;

selecting, by the remote device, second foreground audio that corresponds to the audio theme and that has a third characteristic that is different than the second characteristic; and sending, by the remote device, the second foreground audio to at least one of the second device within the user environment for output on a third speaker of the second device within the user environment or a third device for output on a fourth speaker of the third device.

21. The computer-implemented method of claim 20, wherein the third room is the first room.

22. The computer-implemented method of claim 20, wherein the first audio is background audio.

23. The apparatus of claim 1, the actions further comprising detecting one or more characteristics of the user, the one or more characteristics comprising at least one of a mood of the user, a gender of the user, a relative age of the user, or an activity level of the user; and wherein the one or more characteristics of the user are determined using user voice analysis.

24. The system of claim 5, wherein determining the identity of the user comprises determining that the user is an authorized user.

25. The apparatus of claim 1, wherein a first output of the foreground audio is concurrent with a second output of the background audio.

26. The apparatus of claim 1, the actions further comprising:

selecting second foreground audio having a fourth characteristic of the audio theme; and sending the second foreground audio to the device within the user environment for output on the second speaker of the device within the user environment.

* * * * *